3,703,515
2-(DIHALONITROMETHYL) QUINOXALINES
Wilson F. Gum, Jr., and Christian T. Goralski, Midland, Mich., assignors to The Dow Chemical Company, Midland, Mich.
No Drawing. Filed Dec. 2, 1970, Ser. No. 94,625
Int. Cl. C07d 51/78
U.S. Cl. 260—250 R    9 Claims

ABSTRACT OF THE DISCLOSURE

New 2-(dihalonitromethyl)quinoxalines are prepared by reacting a 2-(nitromethyl)quinoxaline with dilute hypochloride or hypobromite at ca. room temperature. The 2-(nitromethyl)quinoxaline reactant may have methyl-, methoxyl-, ethyl-, ethoxyl-, trifluoromethyl-, carboxylate-, or halo-substitution in the 6- and 7-positions in the carbocyclic ring. The compounds have antimicrobial activity and are useful as germicides.

BACKGROUND OF THE INVENTION

The 2 - (halonitromethyl)quinoxalines have previously been unknown.

SUMMARY OF THE INVENTION

This invention concerns novel 2 - (halonitromethyl) quinoxalines corresponding to the formula

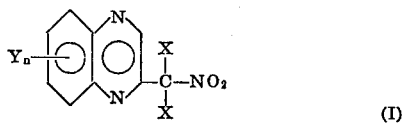

(I)

wherein X represents chloro or bromo and Y represents one of H (i.e., no substitution), halo (chloro or bromo), methyl, ethyl, methoxy, ethoxy, trifluoromethyl or —COOMe, $n$ is an integer from 1 to 2 and Me represents an alkali metal.

The compounds of this invention are prepared by reacting a 2-(nitromethyl)quinoxaline with aqueous alkali metal hypochlorite solution according to the following equation:

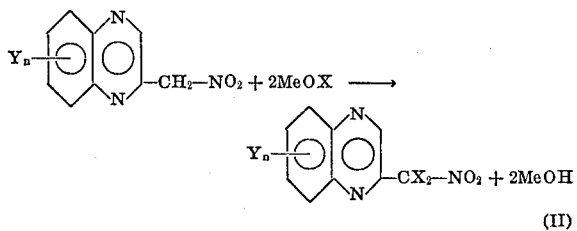

(II)

The reaction is preferably carried out in an organic liquid as reaction medium such as, for example, methylene chloride, ethylene dichloride, carbon tetrachloride, methyl chloroform and the like chlorinated hydrocarbon solvents and mixtures thereof. The reaction goes forward when the reagents are employed in any amounts. The reaction consumes the reagents in molar proportions of substantially one of the 2-(nitromethyl)quinoxaline reagent to two of the hypochlorite reagent. However, optimum results are obtained when hypochlorite in excess amounts over such proportions is used, i.e., for example, from ca. 10% to ca. 100% excess hypochlorite, and the use of such excess amounts represents preferred practice. The reaction proceeds at temperatures from about 15° C. up to the boiling point of the reaction medium, sometimes referred to as an alkali metal hydroxide-liberating temperature. The reacton is completed in a time ranging between about 1 and about 4 hours. Upon completion of the reaction, the product is separated from the reaction medium by conventional procedures.

In a convenient method of carrying out the reaction, a suspension of the 2-(nitromethyl)quinoxaline reactant in the organic reaction medium is mixed with dilute aqueous alk alkali metal hypochlorite solution and vigorously stirred during the reaction period at reaction temperature. Upon completion of the reaction, the reaction mixture is filtered, the filtrate is separated into an aqueous phase and an organic phase and the aqueous phase is extracted with additional portions of organic reaction medium. The volatile reaction medium is distilled off under reduced pressure. The residual oily or solid product crystallizes upon addition of a suitable solvent, such as, for example, lower liquid alkanes such as pentane, hexane, heptane or mixtures thereof, e.g., petroleum ethers. The products are identified by melting point determinations, elemental analyses, infrared (ir.) and nuclear magnetic resonance (nmr.) spectra.

The products of this invention are crystalline solid materials having relatively high melting points. They are relatively insoluble in hexane and soluble in acetone, ethylene dichloride, chloroform and carbon tetrachloride.

DESCRIPTION OF SOME PREFERRED EMBODIMENTS

The following examples describe completely representative specific embodiments of the novel compounds and the best modes contemplated by the inventors for carrying out the invention, but are not to be considered as limiting thereof. Temperatures are given in centigrade degrees.

EXAMPLE 1

2-(dichloronitromethyl)quinoxaline 2-(nitromethyl)quinoxaline (10.0 g., 0.053 mol) suspended in 200 ml. of ethylene dichloride is mixed with 245 g. of aqueous 4% sodium hypochlorite solution (9.8 g. NaOCl, 0.131 mol). The mixture is vigorously stirred for three hours at room temperature. The reaction mixture is filtered. The filtrate is separated into an aqueous phase and an organic phase. The aqueous phase is extracted with three 50 ml. portions of ethylene dichloride. The ethylene dichloride is removed in vacuo yielding a yellow, fluffy solid. The solid is recrystallized from hexane to give 2-(dichloronitromethyl)quinoxaline as pale yellow platelets, M.P. 62°–64°.

Analysis.—Calculated for $C_9H_5Cl_2N_3O_2$ (percent): C, 41.8; H, 1.9; Cl, 27.4; N, 16.3. Found (percent): C, 41.9; H, 1.88; Cl, 27.85; N, 16.0.

The structure is further confirmed by ir. and nmr. spectra.

EXAMPLE 2

6-methyl-2-(dichloronitromethyl)quinoxaline and
7-methyl-2-(dichloronitromethyl)quinoxaline 6- and 7-methyl-2-(nitromethyl)quinoxaline (10.15 g., 0.05 mol) suspended in 250 ml. of ethylene dichloride is mixed with 205 g. of aqueous 5% sodium hypochlorite solution (10.25 g., 0.138 mol). The mixture is vigorously stirred for 3.25 hours at room temperature. The reaction mixture is filtered. The filtrate is separated into an aqueous phase and an organic phase. The aqueous phase is extracted with two 50 ml. portions of ethylene dichloride. The ethylene dichloride is removed in vacuo leaving a dark, red-brown oil which solidifies on addition of a small amount of hexane. Additional hexane is added to bring the volume to approximately 200 ml. The solution is heated to boiling and is filtered. The solution is cooled in an ice bath and 6-methyl-2-(dichloronitromethyl) quinoxaline separates as orange crystals, M.P. 89.5°–94°.

The product is purified by vacuum sublimation to give a white solid, M.P. 92°–95°.

*Analysis.*—Calculated for $C_{10}H_7Cl_2N_3O_2$ (percent): C, 44.14; H, 2.59; Cl, 26.06; N, 15.44. Found (percent): C, 44.4; H, 2.50; Cl, 26.05; N, 15.6.

The mother-liquor is concentrated to approximately 75 ml. The resulting solution is cooled in an ice bath and 7-methyl-2-(dichloronitromethyl)quinoxaline containing ca. 40% of the 6-isomer separates as a pale yellow solid, M.P. 66°–68°. The product is purified by vacuum sublimation to give the 7-isomer containing some of the 6-isomer as a white solid, M.P. 68°–70°.

*Analysis.*—Calculated for $C_{10}H_7Cl_2N_3O_2$ (percent): C, 44.14; H, 2.59; Cl, 26.06; N, 15.44. Found (percent): C, 44.45; H, 2.63; Cl, 26.15; N, 15.15.

Further concentration of the mother-liquor to approximately 15 ml. gives an additional amonut of crude 7-methyl-2-(dichloronitromethyl)quinoxaline, M.P. 66°–68°.

The structures of the 6-methyl and 7-methyl isomers are further confirmed by ir. and nmr. spectra.

EXAMPLE 3

Products corresponding to the following structural formulae are prepared according to procedures described above:

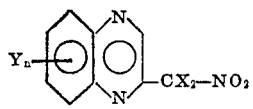

| $Y_n$ | X | Molecular weight |
|---|---|---|
| a. H | Br | 346.98 (M.P. 96.5–98°). |
| b. 6-ethyl | Br | 375.03. |
| c. 6-methoxy | Cl | 288.08 (M.P. 84–85.5°). |
| d. 7-methoxy [1] | Cl | 288.08 (M.P. 58–61°). |
| e. 6- (and 7-) $CF_3$ | Cl | 326.06 (M.P. 78–80°). |
| f. 6,7-dimethyl | Cl | 288.14 (M.P. 110–112°). |
| g. 6,7-diethyl | Br | 403.08. |
| h. 6- (and 7-) $CO_2Na$ | Cl | 324.06 (M.P. >300°). |
| i. 7-Cl [2] | Cl | 292.51 (M.P. 54–57°). |
| j. 6-Cl | Cl | 292.51 (M.P. 93–95°). |
| k. 6,7-dichloro | Br | 415.87. |
| l. 6-ethoxy | Br | 391.03. |
| m. 6-bromo | Cl | 336.97. |

[1] Contains ca. 38% of the 6-isomer.
[2] Contains ca. 20% of the 6-isomer.

The 2-(dihalonitromethyl)quinoxalines of this invention have antimicrobial properties. They have relatively high toxicity toward such bacterial organisms as *Pseudomonas aeruginosa*, *Aerobacter aerogenes*, *Staphylococcus aureus*, *Escherischia coli*, *Mycobacterium phlei*, *Salmonella tayphosa* and *Bacillus subtilis* and toward such fungal organisms as *Trichophyton mentagrophytes*, *Pullularia pullulans*, *Aspergillus terreus*, *Cephaloascus fragans*, *Candida albicans*, *Candida pelliculosa*, Trichoderm sp. Madison P-42 and Ceratocystic ips. This is not to suggest that the compounds claimed and compositions containing them are equally effective at similar concentrations or against the same organisms. The compounds may be applied to such bacterial and fungal plants and their habitats in cidal amounts to obtain control of the microbial organisms which attack seeds, roots or aboveground portions of terrestrial plants. For such uses the unmodified compounds can be employed. The compounds can also be dispersed on an inert finely-divided solid and employed as dusts. Such mixtures can also be dispersed in water with or without the aid of a surface-active agent and employed as sprays. In other procedures, the products can be employed as active constituents in solvent solutions, aqueous dispersions or oil-in-water and water-in-oil emulsions. Good results are obtained with methods employing and compositions containing microbicidal or antimicrobial amounts of the novel compounds. Preferred compositions contain from 0.05 to 50 percent by weight of compound. The compounds may be included in adhesives, cooling waters, inks, plasticizers, latices, polymers, resins, fuels, greases, soaps, detergents, cutting oils and oil or latex paints to prevent mold and mildew and the degradation of such products resulting from microbial attack. Also, it has been discovered that the compounds advantageously may be distributed on or in textiles, fabrics and paper or other cellulosic products, or may be employed in the impregnation of wood, lumber, wallboard and plaster to protect such products from the attack of the organisms or rot, mold, mildew and decay.

In representative operations, each of the compounds of Examples 1, 2 and 3(a) through 3(m) gives complete kills and controls of *Staphylococcus aureus*, *Trichophyton mentagrophytes*, *Candida albicans*, *Candida pelliculosa*, *Bacillus subtilis*, *Pullularia pullulans*, *Aspergillus terreus*, *Cephaloascus fragans* and Ceratocytis ips. when employed in nutrient agar at a concentration of between 100 and 500 parts per million by weight.

Also, the compounds of Examples 3(a) and 3(h) give complete kills and controls of *Pseudomonas aeruginosa* and *Aerobacter aerogenes* when employed in nutrient agar at a concentration between 100 and 500 parts per million by weight.

PREPARATION OF STARTING MATERIALS

The 2-(nitromethyl)quinoxaline starting materials are best prepared by the method of H. Feuer et al., J.A.C.S. 91, 1856 (1969): "The Alkyl Nitrate Nitration of Active Methylene Compounds. VI. A New Synthesis of α-Nitroalkyl Heterocyclics." The 2-(nitromethyl)quinoxaline starting materials having 6- (and 7-)methyl, 6- (and/or 7-)nitro, 6- (and/or 7-)chloro and 6- (and/or 7-)carboxy substitution may also be prepared by the method of P. E. Fanta et al., J. Heterocycl. Chem. 3, 525 (1966): "Derivatives of 2-Nitromethylquinoxaline."

What is claimed is:

1. A 2-(halonitromethyl)quinoxaline corresponding to the formula

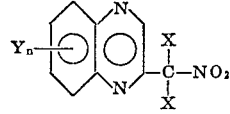

wherein X represents chloro or bromo, Y represents one of hydrogen, chloro, bromo, methyl, ethyl, methoxy, ethoxy, trifluoromethyl and —COOMe, wherein Me represents an alkali metal and $n$ is an integer from 1 to 2.

2. The compound of claim 1 wherein X is chloro and Y is hydrogen.

3. The compound of claim 1 wherein X is chloro, Y is 6-methyl or 7-methyl and $n$ is 1.

4. The compound of claim 1 wherein X is bromo and Y is hydrogen.

5. The compound of claim 1 wherein X is chloro, Y is 6-methoxy or 7-methoxy and $n$ is 1.

6. The compound of claim 1 wherein X is chloro, Y is 6-trifluoromethyl or 7-trifluoromethyl and $n$ is 1.

7. The compound of claim 1 wherein X is chloro, Y is methyl, $n$ is 2 and the methyl groups are in the 6- and 7-positions.

8. The compound of claim 1 wherein X is chloro, Y is 6-COONa or 7-COONa and $n$ is 1.

9. The compound of claim 1 wherein X is chloro, Y is 6-chloro or 7-chloro and $n$ is 1.

References Cited

UNITED STATES PATENTS 3,453,365   7/1969   Lane et al. _____ 260—250 R

NICHOLAS S. RIZZO, Primary Examiner

U.S. Cl. X.R.

424—250